(12) United States Patent
Katsukura

(10) Patent No.: US 12,007,135 B2
(45) Date of Patent: Jun. 11, 2024

(54) AIR CONDITIONING SYSTEM AND SYSTEM CONTROLLER WITH DISPLAY AUTOMATICALLY CHANGING LANGUAGE DISPLAYED ACCORDING TO USER MAKING RESERVATION

(71) Applicant: Mitsubishi Electric Corporation, Tokyo (JP)

(72) Inventor: Makoto Katsukura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 853 days.

(21) Appl. No.: 17/049,354

(22) PCT Filed: Jun. 13, 2018

(86) PCT No.: PCT/JP2018/022503
§ 371 (c)(1),
(2) Date: Oct. 21, 2020

(87) PCT Pub. No.: WO2019/239507
PCT Pub. Date: Dec. 19, 2019

(65) Prior Publication Data
US 2021/0247088 A1    Aug. 12, 2021

(51) Int. Cl.
*F24F 11/52* (2018.01)
(52) U.S. Cl.
CPC .................................. *F24F 11/52* (2018.01)
(58) Field of Classification Search
CPC ...................................................... F24F 11/52
See application file for complete search history.

(56) References Cited

U.S. PATENT DOCUMENTS

| 2007/0226019 A1* | 9/2007 | Carlson ................. G06Q 10/02 705/5 |
| 2010/0070087 A1* | 3/2010 | Shima ...................... F24F 11/54 700/277 |
| 2019/0033807 A1 | 1/2019 | Inoue et al. |

(Continued)

FOREIGN PATENT DOCUMENTS

| CN | 101030270 A | * | 9/2007 |
| CN | 108958052 A | * | 12/2018 |

(Continued)

OTHER PUBLICATIONS

International Search Report of the International Searching Authority mailed Sep. 11, 2018 for the corresponding International application No. PCT/JP2018/022503 (and English translation).

(Continued)

*Primary Examiner* — Suresh Suryawanshi
(74) *Attorney, Agent, or Firm* — Posz Law Group, PLC

(57) ABSTRACT

An air conditioning system includes an air conditioner, a remote controller, and a system controller. The air conditioner performs air conditioning for a room. The remote controller displays an operation state of the air conditioner and controls operation of the air conditioner. The remote controller is placed in the room. The system controller controls the remote controller. The system controller causes the remote controller to change a display form for the operation state according to a first language used when a user makes a reservation for staying in the room.

14 Claims, 7 Drawing Sheets

(56) References Cited

U.S. PATENT DOCUMENTS

2020/0064011 A1* 2/2020 Nakano .................... F24F 11/56
2020/0125806 A1* 4/2020 Obana ..................... G06F 40/58

FOREIGN PATENT DOCUMENTS

| | | | |
|---|---|---|---|
| JP | 2002024412 A | * | 1/2002 |
| JP | 2004-503884 A | | 2/2004 |
| JP | 2006-046686 A | | 2/2006 |
| JP | 2017-130833 A | | 7/2017 |
| KR | 20090033682 A | * | 4/2009 |
| WO | 01/97156 A1 | | 12/2001 |
| WO | 2016/139733 A1 | | 9/2016 |

OTHER PUBLICATIONS

European Search Report dated May 17, 2021, issued in corresponding European Patent Application No. 18922448.8.

Office Action dated Jun. 15, 2021, issued in corresponding JP Patent Application No. 2020-524999 ( and English translation).

Office Action dated Jul. 1, 2021, issued in corresponding CN Patent Application No. 201880093781.X (and English Machine Translation).

Office Action issued on Oct. 5, 2021 issued in corresponding JP Application No. 2020-524999 (and English translation).

Decision of Refusal issued on Feb. 22, 2022 issued in corresponding JP Application No. 2020-524999 (and English translation).

Office Action issued on Aug. 9, 2023 in connection with counterpart European Patent Application No. 18922448.8.

Reconsideration Report drafted on Jul. 27, 2022 in connection with counterpart Japanese Patent Application No. 2020-524999 (and English machine translation).

Second Notification of Reasons for Refusal dated Feb. 21, 2022 issued in connection to CN application No. 201880093781.X (and Machine Translation).

* cited by examiner

FIG. 3
| DATE | GUEST NAME | ADDRESS | RESERVATION DISPLAY LANGUAGE | ROOM NUMBER |
|---|---|---|---|---|
| 2018/1/25 | XXXXXX | AAA | JAPANESE | 101 |
| 2018/1/25 | YYYYYY | BBB | BRITISH ENGLISH | 102 |
| 2018/1/25 | ZZZZZZ | CCC | AMERICAN ENGLISH | 103 |
| ⋮ | ⋮ | ⋮ | ⋮ | ⋮ |
FIG. 4A
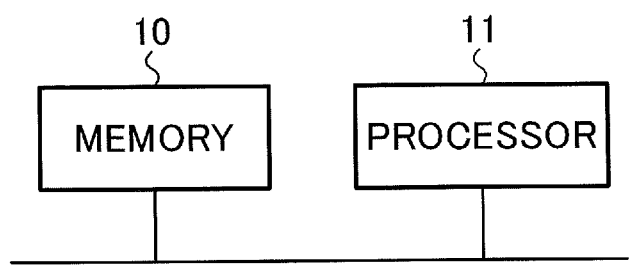
FIG. 4B
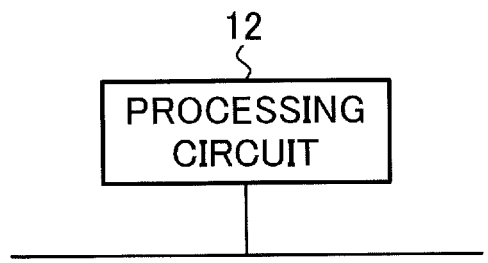

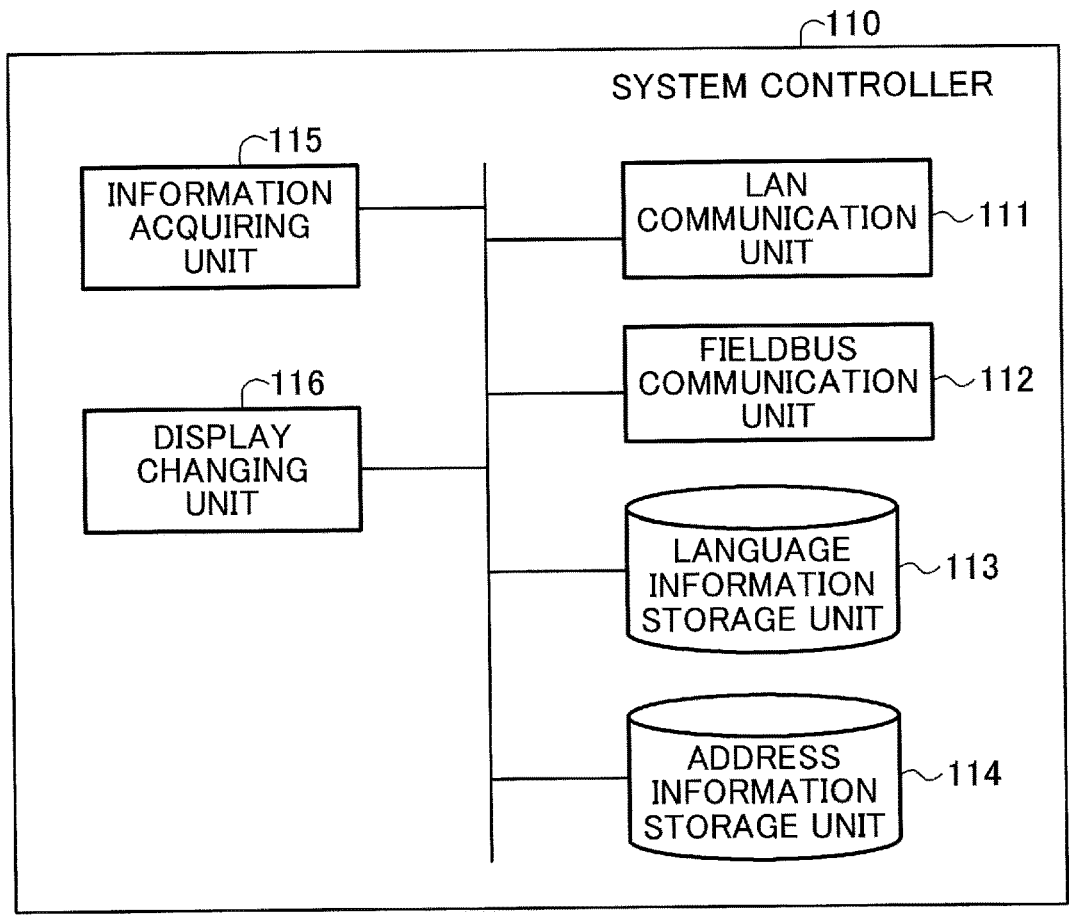

FIG. 9

| LANGUAGE | FIRST MODE | SECOND MODE |
|---|---|---|
| JAPANESE | HEATING ☀ | COOLING 🪭 |
| AMERICAN ENGLISH | HEAT 🔥 | COOL ❄ |
| BRITISH ENGLISH | HEATING ♨ | COOLING ❆ |
| ⋮ | ⋮ | ⋮ |

AIR CONDITIONING SYSTEM AND SYSTEM CONTROLLER WITH DISPLAY AUTOMATICALLY CHANGING LANGUAGE DISPLAYED ACCORDING TO USER MAKING RESERVATION

CROSS REFERENCE TO RELATED APPLICATION

This application is a U.S. national stage application of International Patent Application No. PCT/JP2018/022503 filed on Jun. 13, 2018, the disclosure of which is incorporated herein by reference.

TECHNICAL FIELD

The present invention relates to an air conditioning system.

BACKGROUND

Due to, for example, an increase in the number of international travelers in recent years, travelers from many different countries have been staying in hotel rooms. Remote controllers for air conditioners are of mounted types, and the operation states of the air conditioners are displayed by specific languages and pictograms.

The interpretation of a character string (descriptive character string) and a pictogram regarding the operation state of an air conditioner has been known to differ depending on the cultural background of each country. For example, some areas use an image of combustion-type equipment, such as a fireplace, as a mark indicating heating, and other areas use an image of a radiator, such as a steam radiator.

In regard to this, for example, there is a technique of displaying the operation state of an air conditioner by a character string in a language that can be understood by the guest, by switching the display language of the remote controller of the air conditioner (refer to, for example, Patent Literature 1).

PATENT REFERENCE

Patent Literature 1: Japanese Patent Application Publication No. 2006-46686

However, with the conventional technique, the operations leading up to the switching of language must be performed in a display state that is difficult to understand by the guests. Therefore, there is a risk that a guest may inadvertently perform an incorrect operation of the air conditioner.

SUMMARY

A purpose of one or more aspects of the invention is to enable automatic change of the display mode of the operation state of an air conditioner to a display mode easily understandable by a guest, by using information acquired at the time of reservation for the stay.

An air conditioning system according to an aspect of the present invention includes an air conditioner, an equipment management device, and a system controller. The air conditioner performs air conditioning for a room. The air conditioner is provided in the room. The equipment management device displays an operation state of the air conditioner and controls operation of the air conditioner. The equipment management device is placed in the room. The system controller controls the equipment management device. The system controller causes the equipment management device to change a display form for the operation state according to a first language used when a user makes a reservation for staying in the room.

According to an aspect of the invention, the display mode of the operation state of an air conditioner can be automatically changed to a display mode easily understandable by a guest, by using information acquired when a reservation was made for the stay.

BRIEF DESCRIPTION OF THE DRAWINGS

FIG. 3 is a schematic diagram illustrating an example of accommodation management information.

FIGS. 4A and 4B are block diagrams illustrating hardware configuration examples.

FIG. 5 is a block diagram schematically illustrating the configuration of a system controller.

FIG. 6 is a schematic diagram illustrating an example of language information.

FIG. 9 is a schematic diagram illustrating an example of pictogram information.

DETAILED DESCRIPTION

Figure 1:
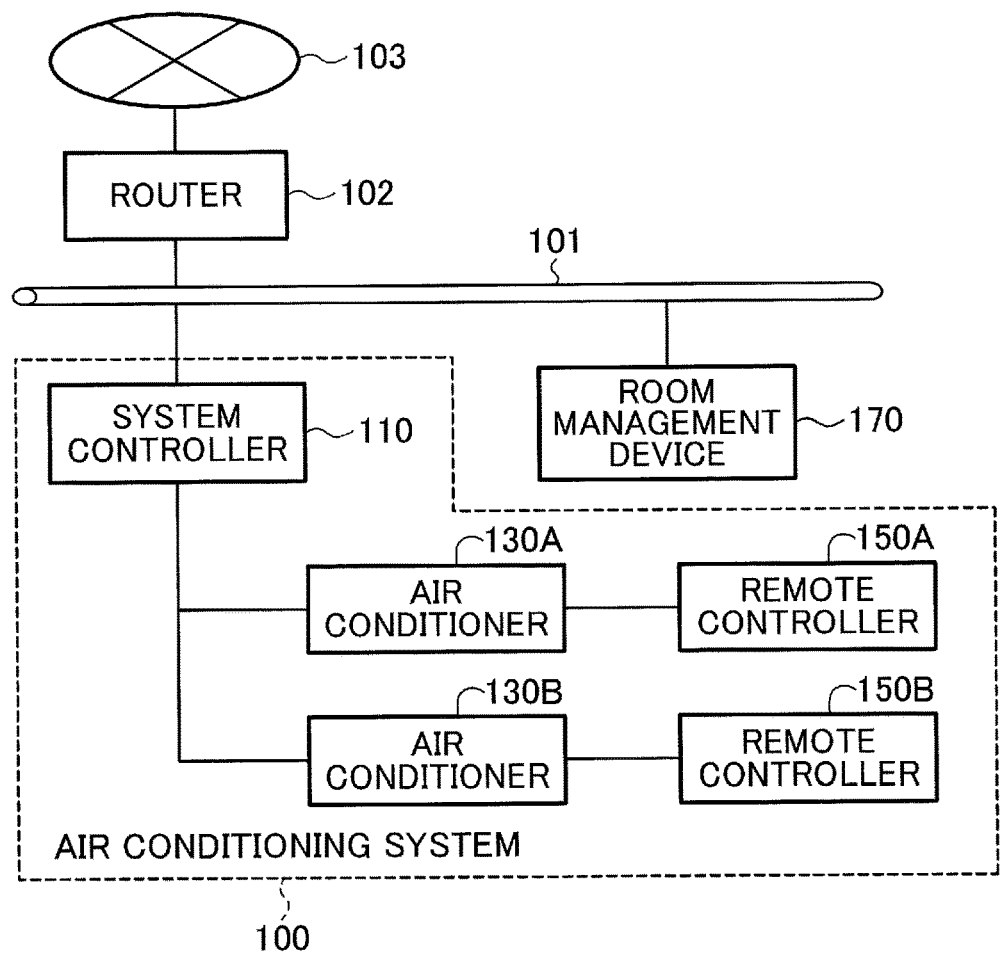
FIG. 1 is a block diagram schematically illustrating the configuration of an air conditioning system.

FIG. 1 is a block diagram schematically illustrating the configuration of an air conditioning system 100 according to an embodiment.

The air conditioning system 100 includes a system controller 110, air conditioners 130A and 130B, and remote controllers (hereinafter referred to as remotes) 150A and 150B functioning as facility management devices.

The system controller 110 is able to communicate with a room management device 170 via a LAN (local area network) 101 functioning as a communication network.

Note that the room management device 170 can be accessed from the Internet 103 via a router 102.

The air conditioner 130A is controlled by the remote 150A. For example, the air conditioner 130A and the remote 150A should be provided in the same room in a hotel.

The air conditioner 130B is controlled by the remote 150B. For example, the air conditioner 130B and the remote 150B should be provided in the same room of a hotel.

Note that, when there is no need to distinguish between the air conditioners 130A and 130B, each of the air conditioners 130A and 130B is referred to as an air conditioner 130.

When there is no need to distinguish between the remotes 150A and 150B, each of the remotes 150A and 150B is referred to as a remote 150.

The air conditioner 130 performs air conditioning of a room.

The remote 150 is placed in the same room as a corresponding air conditioner 130, displays the operation state of the air conditioner 130, and controls the operation of the air conditioner 130.

The air conditioner 130 and the remote 150 are centrally controlled by the system controller 110.

The system controller 110 can change the display setting of the remote 150. Specifically, the system controller 110 causes the corresponding remote 150 to change a display form for the operation state of the air conditioner 130 provided in the room of the hotel, in accordance with the language used by a user when a reservation was made to stay in the room. Here, the language used by the user when the reservation was made is also referred to as a first language.

The system controller 110 can acquire, from the room management device 170, information on guests staying in the rooms of which the air conditioning is controlled by the system controller 110.

The room management device 170 is connected to the Internet 103 via the router 102, and displays a Web page for making a reservation for a stay on a terminal (not illustrated) operated by the user who wants accommodation. The reservation page can be displayed in various languages for guests from various countries. It is assumed that, when making a reservation for a stay, the user first selects a display language as the language to be used for displaying the reservation page.

The system controller 110 communicates with the remote 150, and the remote 150 sets the display form for a screen display indicating the operation state of the air conditioner 130. Specifically, a setting command indicating the language to be displayed is sent to each remote 150.

Figure 2:
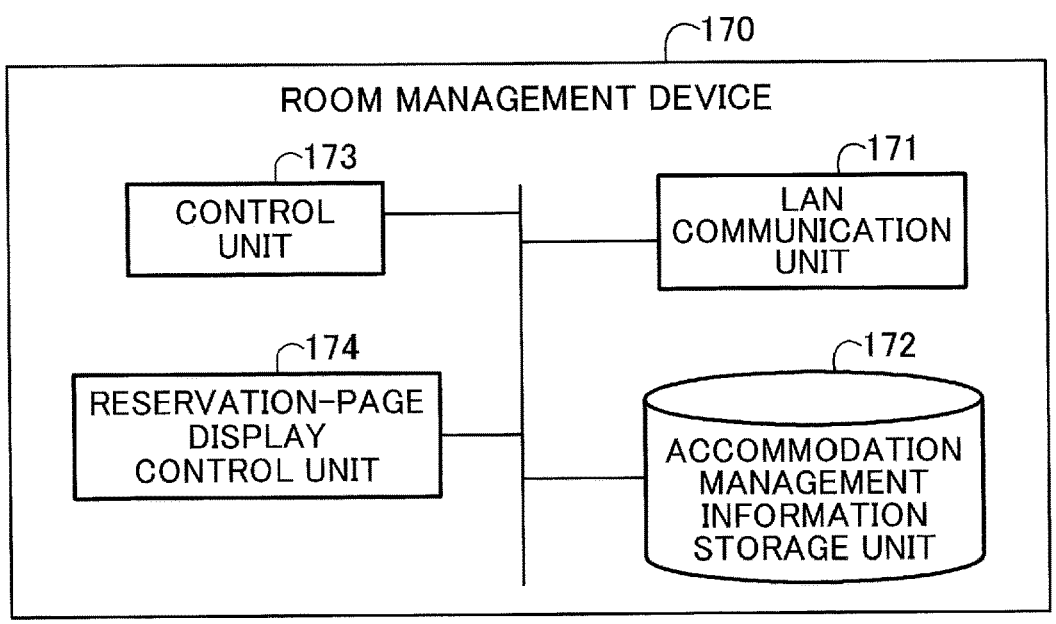
FIG. 2 is a block diagram schematically illustrating the configuration of a room management device.

FIG. 2 is a block diagram schematically illustrating the configuration of the room management device 170.

The room management device 170 includes a LAN communication unit 171, an accommodation management information storage unit 172, a control unit 173, and a reservation-page display control unit 174.

The LAN communication unit 171 communicates via the LAN 101.

The accommodation management information storage unit 172 stores accommodation management information including guest information which is information about users who want accommodation.

FIG. 3 is a schematic diagram illustrating an example of the accommodation management information.

As illustrated, an accommodation management table 172a, which is an example of accommodation management information, includes a date column 172b, a guest name column 172c, an address column 172d, a reservation display language column 172e, and a room number column 172f.

The date column 172b stores dates of users' stays.

The guest name column 172c stores guest names as user identification information or guest identification information for identifying the users who are staying.

The address column 172d stores the addresses of the users who are staying.

The reservation display language column 172e stores language names as language identification information for identifying reservation display languages that are the languages used by the users when the reservations for the stays were made. A reservation display language is, for example, the language displayed on the reservation page on which a user made a reservation for a stay, that is, the language used when a reservation was made.

The room number column 172f stores room numbers as room identification information for identifying the rooms in which the users are staying.

The accommodation management table 172a can correlate a user with the language used by the user to make the reservation and space (room) used by the user.

Referring back to FIG. 2, the control unit 173 controls the overall processing by the room management device 170.

The reservation-page display control unit 174 generates a reservation page that is a Web page for the user to make a reservation for a stay, displays the reservation page on a terminal used by the user, and acquires reservation information from the user and the language name of the language used by the user to make the reservation.

For example, when a user who wants accommodation uses a terminal to access the room management device 170, the reservation-page display control unit 174 generates, for the terminal, a reservation page for entering reservation information, such as check-in date, the number of guests, room type, address, and name, in a predetermined language and sends the reservation page to the terminal via the LAN communication unit 171. The reservation page is displayed on the terminal.

At the head of the reservation page, multiple buttons indicating display languages are displayed, and the user can change the display language of the reservation page by selecting one of the buttons. The reservation information and the language name of the display language are sent to the room management device 170 as a result of the user entering the required information to the reservation page and instructing the information to be sent.

Note that the selection of the display language of the reservation page is not limited to selection through multiple buttons; alternatively, for example, the display language may be selected from a pull-down menu or may be automatically selected by entering or selecting specific information, which is, for example, a country or address.

The reservation-page display control unit 174 acquires the reservation information and the language name of the reservation display language from the LAN communication unit 171, generates guest information from the reservation information, and stores the guest information and the language name of the reservation display language in the accommodation management table 172a. Note that, as illustrated in FIG. 3, the guest information is information consisting of date, guest name, address, and room number.

A portion or the entirety of the control unit 173 and the reservation-page display control unit 174 described above can be implemented by, for example, a memory 10 and a processor 11, such as a central processing unit (CPU), that executes the programs stored in the memory 10, as illustrated in FIG. 4A. Such programs may be provided via a network or may be recorded and provided on a recording medium. That is, such programs may be provided as, for example, program products.

A portion of the control unit 173 and the reservation-page display control unit 174, for example, can be implemented by a processing circuit 12, such as a single circuit, a composite circuit, a programmed processor, a parallel programmed processor, an application-specific integrated circuit (ASIC), or a field programmable gate array (FPGA), as illustrated in FIG. 4B.

Note that the LAN communication unit 171 can be implemented by a network interface card (NIC), and the accommodation management information storage unit 172 can be implemented by a storage device, such as a volatile or non-volatile memory, or a hard disc drive (HDD).

FIG. 5 is a block diagram schematically illustrating the configuration of the system controller 110.

The system controller 110 includes a LAN communication unit 111, a fieldbus communication unit 112, a language information storage unit 113, an address information storage unit 114, an information acquiring unit 115, and a display changing unit 116.

The LAN communication unit 111 communicates via the LAN 101.

The fieldbus communication unit 112 communicates with the air conditioner 130.

The language information storage unit 113 stores language information which is information indicating the comprehensibility between a reservation display language and a displayable language that is a language that is supported and displayable by the remote 150.

FIG. 6 is a schematic diagram illustrating an example of the language information.

A language table 113a, which is an example of the language information, includes a reservation display language column 113b, a displayable language column 113c, and a comprehensibility column 113d.

The reservation display language column 113b stores language names of reservation display languages.

The displayable language column 113c stores language names of displayable languages.

The comprehensibility column 113d stores comprehensibility that is the degree of ease of understanding of the corresponding displayable language by a native speaker of the corresponding reservation display language.

The language table 113a can correlate the reservation display language with the displayable language and the comprehensibility.

The address information storage unit 114 stores address information correlating a room number and an address for communication with the remote 150 of the air conditioner 130 placed in the room identified by the corresponding room number.

The information acquiring unit 115 accesses the room management device 170 via the LAN communication unit 111 and acquires display information that is information indicating the language used when a reservation was made and the room number. The information acquiring unit 115 acquires the display information at every predetermined interval, which is, for example, every hour.

The display changing unit 116 sets the display form for the remote 150 placed in each room on the basis of the acquired display information.

For example, when the remote 150 placed in the room in which the user is staying supports the language used by the user when the reservation was made, the display changing unit 116 causes the operation state of the corresponding air conditioner 130 to be displayed in the display form corresponding to the language.

Note that the display form corresponding to the language used by the user when the reservation was made is also referred to as a first display form. A screen image displayed on the remote 150 in the first display form is also referred to as a first screen image.

In contrast, when the remote 150 placed in the room in which the user is staying does not support the language used by the user when the reservation was made, the display changing unit 116 causes the operation state of the air conditioner 130 corresponding to the remote 150 to be displayed in a display form corresponding to the language having the highest comprehensibility out of the languages supported by the remote 150. The comprehensibility is the degree of ease of understanding by a native speaker of the language used by the user when the reservation was made.

Note that the language having the highest comprehensibility with respect to the language used by the user when the reservation was made is also referred to as a second language, and the display form corresponding to the second language is also referred to as a second display form. A screen image displayed on the remote 150 in the second display form is also referred to as a second screen image.

Note that, to change the display form for the remote 150, the display changing unit 116 sends a setting command indicating the name of the language after the change as the language to be displayed, from the fieldbus communication unit 112 to the corresponding air conditioner 130.

A portion or the entirety of the information acquiring unit 115 and the display changing unit 116 described above can be implemented by, for example, a memory 10 and a processor 11 that executes the programs stored in the memory 10, as illustrated in FIG. 4A.

A portion of the information acquiring unit 115 and the display changing unit 116 can also be implemented by, for example, a processing circuit 12, as illustrated in FIG. 4B.

Note that the LAN communication unit 111 can be implemented by a NIC; the fieldbus communication unit 112 can be implemented by a communication interface for communication with the air conditioner 130; and the language information storage unit 113 and the address information storage unit 114 can be implemented by storage devices, such as volatile or non-volatile memories, or HDDs.

Figure 7:
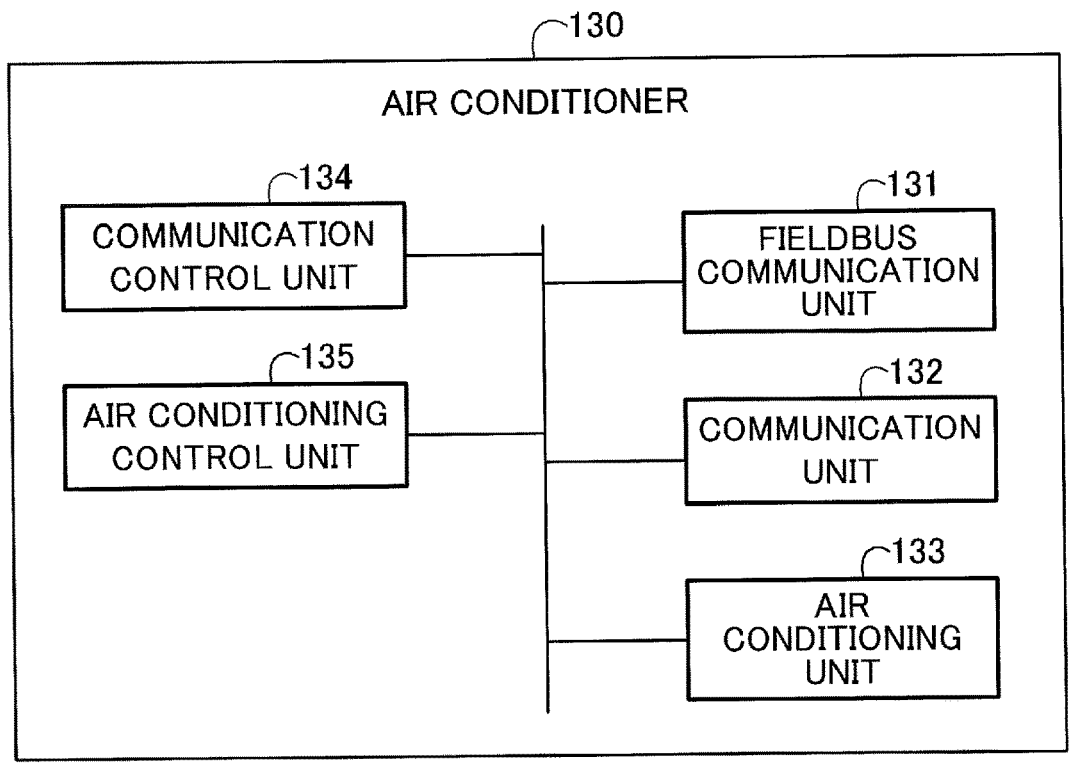
FIG. 7 is a block diagram schematically illustrating the configuration of an air conditioner.

FIG. 7 is a block diagram schematically illustrating the configuration of the air conditioner 130.

The air conditioner 130 includes a fieldbus communication unit 131, a communication unit 132, an air conditioning unit 133, a communication control unit 134, and an air conditioning control unit 135.

The fieldbus communication unit 131 communicates with the system controller 110.

The communication unit 132 communicates with the remote 150.

The air conditioning unit 133 performs air conditioning of the room in which the air conditioner 130 is installed. The air conditioning unit 133 includes, for example, a heat exchanger, a fan, etc.

The communication control unit 134 controls communication via the fieldbus communication unit 131 and the communication unit 132. For example, the communication control unit 134 acquires a setting command from the system controller 110 via the fieldbus communication unit 131 and transmits the setting command from the communication unit 132 to the remote 150.

The air conditioning control unit 135 controls the air conditioning unit 133 in response to an instruction from the remote 150. For example, the air conditioner 130 controls the operation of the fan, etc., included in the air conditioning unit 133 in response to a command regarding the setting of the operation state received from the remote 150.

A portion or the entirety of the communication control unit 134 and the air conditioning control unit 135 described above can be implemented by, for example, a memory 10 and a processor 11 that executes the programs stored in the memory 10, as illustrated in FIG. 4A.

A portion or the entirety of the communication control unit 134 and the air conditioning control unit 135 can also be implemented by, for example, a processing circuit 12, as illustrated in FIG. 4B.

Note that the fieldbus communication unit 131 can be realized by a communication interface for communication with the system controller 110, and the communication unit 132 can be realized by a communication interface for communication with the remote 150.

Figure 8:
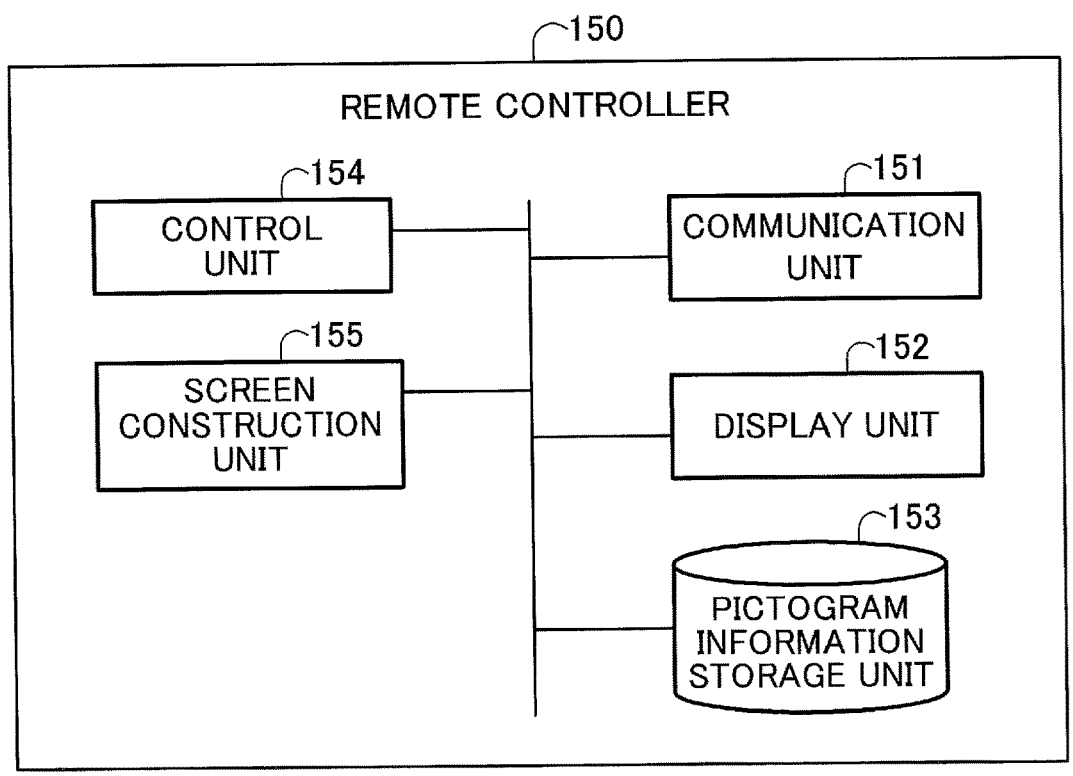
FIG. 8 is a block diagram schematically illustrating the configuration of a remote controller.

FIG. 8 is a block diagram schematically illustrating the configuration of the remote 150.

The remote 150 includes a communication unit 151, a display unit 152, a pictogram information storage unit 153, a control unit 154, and a screen construction unit 155.

The communication unit 151 communicates with the air conditioner 130.

The display unit 152 displays various screen images.

The pictogram information storage unit 153 is a display-form information storage unit that stores pictogram information as display form information that correlates the language to be displayed with the display form for the operation state.

FIG. 9 is a schematic diagram illustrating an example of pictogram information.

A pictogram table 153*a* that is an example of pictogram information includes a language column 153*b*, a first mode column 153*c*, and a second mode column 153*d*.

The language column 153*b* stores language names.

The first mode column 153*c* stores display forms of heating, which is a first mode of the operation state. Here, each of the display forms combines a character string indicating the operation state and a pictogram that is a picture that allows comprehension of the operation state; however, each of the display forms may be one of the character string and the pictogram.

The second mode column 153*d* stores display forms of cooling, which is a second mode of the operation state.

The pictogram table 153*a* makes it possible to identify the display form corresponding to the language to be displayed indicated by the setting command sent from the system controller 110.

For example, if the language to be displayed is Japanese, the display form can be identified which has a combination of a character string, "heating," indicating the first mode in Japanese and a picture of a "sun mark," which is a pictogram understandable by a native Japanese speaker as the first mode. If the language to be displayed is Japanese, the display form can be identified which has a combination of a character string, "cooling," functioning as a descriptive character string of the second mode and a picture of a "fan" functioning as a pictogram of the second mode.

If the language to be displayed is American English, the display form can be identified which has a combination of the character string, "HEAT," functioning as a descriptive character string of the first mode and a picture of a "flame mark" functioning as a pictogram of the first mode. If the language to be displayed is American English, the display form can be identified which has a combination of a character string, "COOL," functioning as a descriptive character string of the second mode and a picture of a "snow crystal" functioning as a pictogram of the second mode.

In this way, the pictogram table 153*a* correlates the language with the descriptive character string of the operation state of the air conditioner 130 with the pictogram that intuitively shows the operation state of the air conditioner 130 to the guest.

The descriptive character string of the pictogram table 153*a* is saved as character codes, and the pictogram is saved as binary data in bitmap format.

Although this embodiment has only two modes, the first mode and the second mode, there may be more than three modes or only one mode of the operation state.

Referring back to FIG. 8, the control unit 154 controls the air conditioner 130. For example, the control unit 154 controls the operation state of the air conditioner 130 so as to reach a set temperature specified by the guest.

The screen construction unit 155 reads the display form from the pictogram information storage unit 153 in accordance with the setting command sent from the system controller 110 and generates a screen image indicating the operation state of the air conditioner 130. The operation state is indicated by a combination of a character string and a pictogram, as described above.

Figure 10:
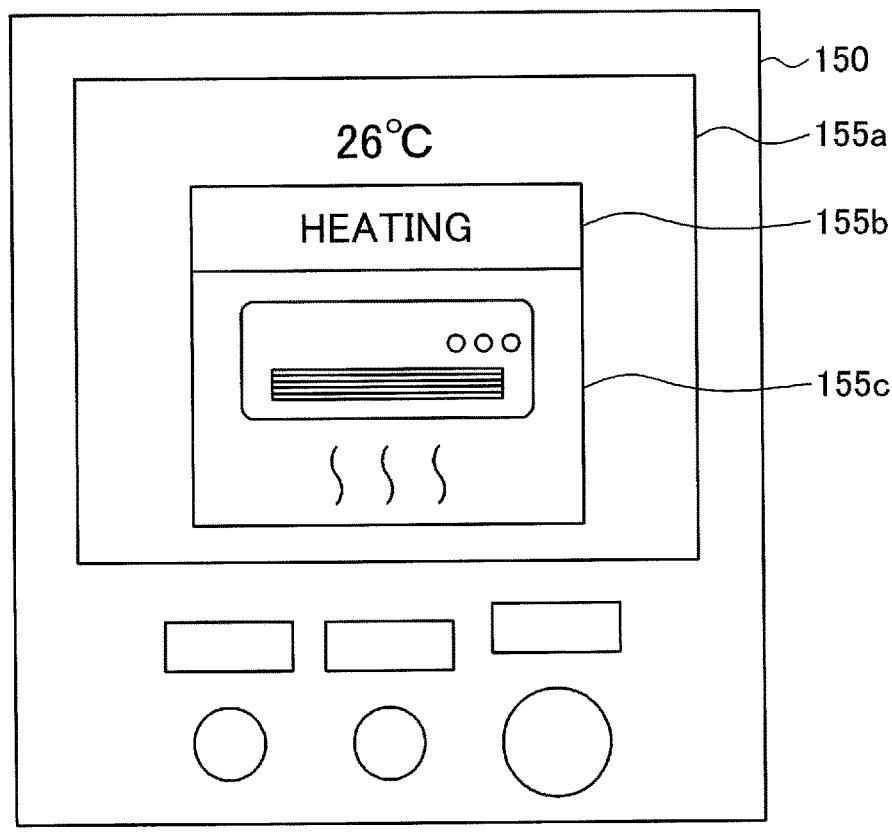
FIG. 10 is a schematic diagram illustrating an example of a screen image displayed on a display unit.

FIG. 10 is a schematic diagram illustrating an example of a screen image displayed on the display unit 152.

A screen image 155*a* that displays the operation state of the air conditioner 130 generated by the screen construction unit 155 includes a character string 155*b* and a pictogram 155*c*.

The character string 155*b* is constructed from a set of character codes indicating the characters and font data that holds the display content of each character on the screen. The screen construction unit 155 constructs the character string 155*b* by linking font data corresponding to the character codes.

The screen construction unit 155 reads a pictogram saved in the pictogram information storage unit 153 and combines it with a character string to compose the screen image 155*a*.

Note that the character string 155*b* and the pictogram 155*c* are represented by a set of dots displayed on liquid crystal functioning as the display unit 152.

A portion or the entirety of the control unit 154 and the screen construction unit 155 described above can be implemented by, for example, a memory 10 and a processor 11 that executes the programs stored in the memory 10, as illustrated in FIG. 4A.

A portion or the entirety of the control unit 154 and the screen construction unit 155 can also be implemented by, for example, a processing circuit 12, as illustrated in FIG. 4B.

Note that the communication unit 151 can be implemented by a communication interface for communication with the air conditioner 130.

The display unit 152 can be implemented by a display such as liquid crystal.

The pictogram information storage unit 153 can be implemented by a volatile or non-volatile memory.

Figure 11:
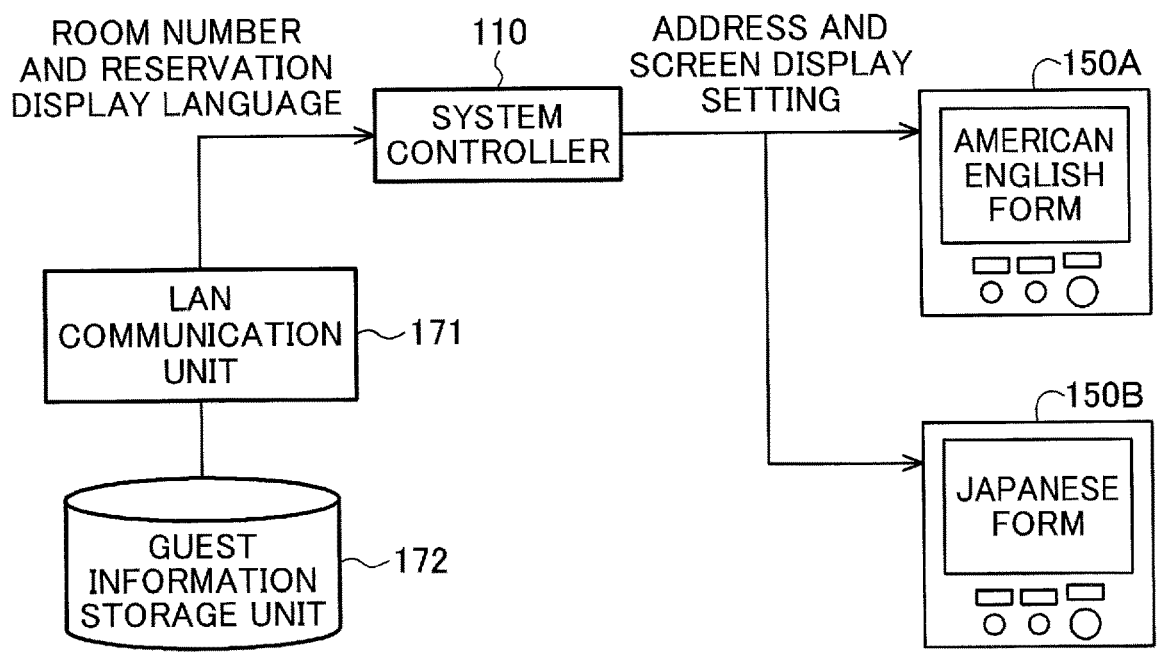
FIG. 11 is a schematic diagram illustrating the flow of data.

FIG. 11 is a schematic diagram illustrating the flow of data in this embodiment.

The accommodation management information storage unit 172 of the room management device 170 records accommodation management information including date, guest name, address, reservation display language, and room number. The accommodation management information also includes personal information.

Every hour, the system controller 110 accesses the room management device 170 and acquires display information indicating room numbers and reservation display languages, which are information other than personal information. Here, the display information that is acquired is only that of which the date indicated in the accommodation management information matches the current date.

The system controller 110 stores address information that correlates a room number with an address of a remote 150 of an air conditioner 130 installed in the room identified by the room number. The system controller 110 refers to the address information and determines which remote 150 at which address is to be set to which display form for which language. This causes the display form for the remote 150 of each room to correspond to the language used when a reservation was made by the guest staying in the room.

However, the number of languages displayable by the facility management device is less than the number of languages displayable by the reservation page. As a result, in some cases, the facility management device may not be able to display the language that was displayed on the reservation page. This embodiment also addresses such a case. Details of the operation will be described below.

Figure 12:
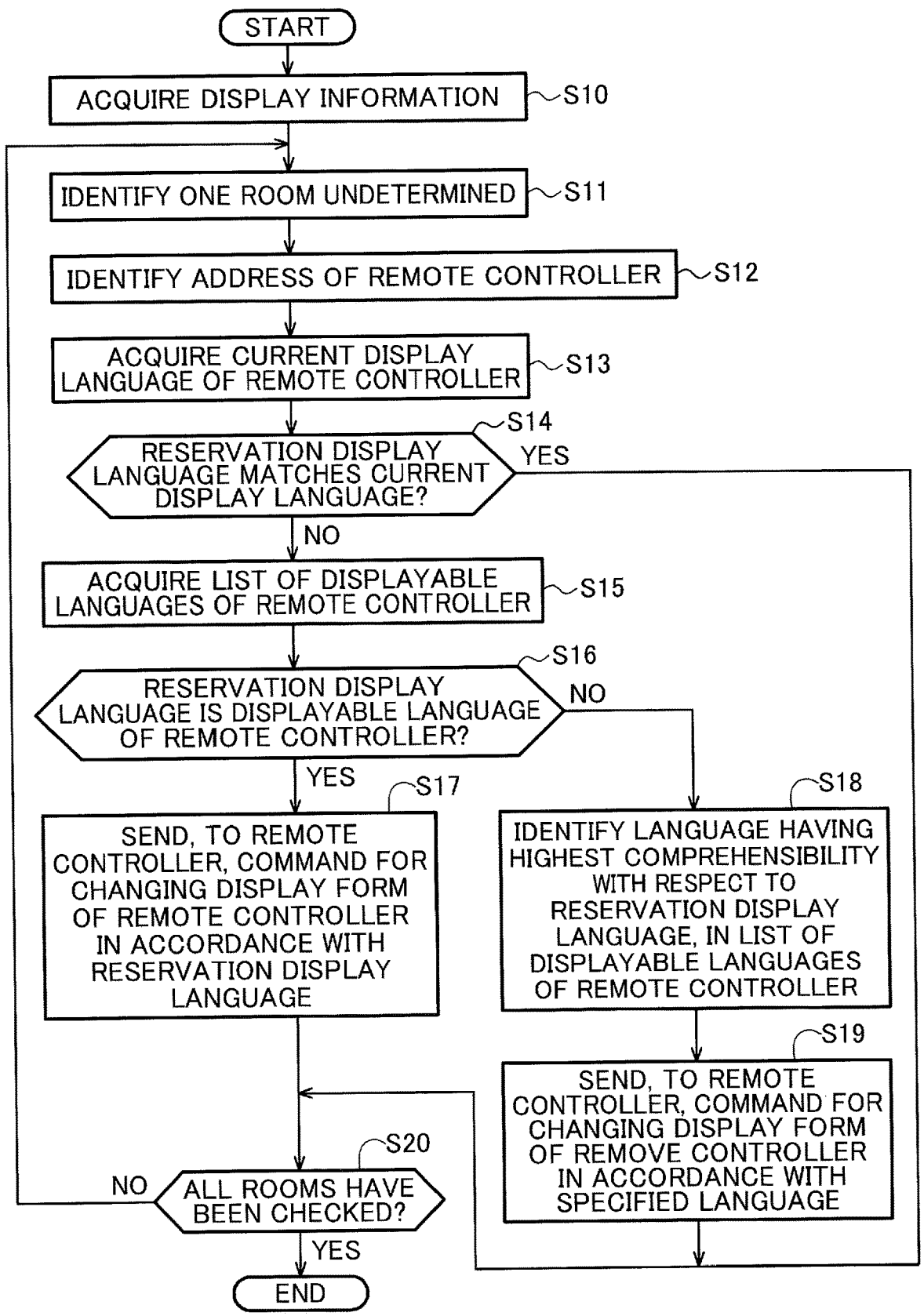
FIG. 12 is a flowchart illustrating the operation of a system controller for setting a display setting of a remote controller.

FIG. 12 is a flowchart illustrating the operation of the system controller 110 for setting the display setting of the remote 150.

First, the information acquiring unit 115 acquires the display information every hour from the room management device 170 (step S10). The acquired display information is the room number and the reservation display language, which is the accommodation management information excluding personal information, as described above.

Next, the display changing unit 116 identifies one room number that has not yet been determined in step S14 out of the room numbers indicated in the display information (step S11).

The display changing unit 116 then refers to the address information stored in the address information storage unit 114 and identifies the address of the remote 150 of the air conditioner 130 set to the room corresponding to the room number identified in step S11 (step S12).

The display changing unit 116 then acquires the current display language, which is the language corresponding to the current display form, from the remote 150 of the address identified in step S12 (step S13). Specifically, the display changing unit 116 sends a request command that is a command for requesting the transmission of the current display language information indicating the current display language, to the remote 150 via the fieldbus communication unit 112. In the remote 150 that received the request command, the screen construction unit 155 sends the current display language information indicating the current display language corresponding to the screen image displayed on the display unit 152, to the system controller 110 via the communication unit 151.

The display changing unit 116 then determines whether or not the reservation display language corresponding to the room number identified in step S11 matches the current display language acquired in step S13 (step S14). If these do not match (No in step S14), the process proceeds to step S15, and if these match (Yes in step S14), the process proceeds to step S20.

In step S15, the display changing unit 116 acquires a list of displayable languages from the remote 150 of the address specified in step S12. Specifically, the display changing unit 116 sends a request command that is a command for requesting the transmission of the list of displayable languages, to the remote 150 via the fieldbus communication unit 112. In the remote 150 that received the request command, the screen construction unit 155 sends the list of displayable languages to the system controller 110 via the communication unit 151.

The display changing unit 116 then determines whether or not the reservation display language corresponding to the room number identified in step S11 is a language displayable on the remote 150 of the address identified in step S12 (step S16). Specifically, the display changing unit 116 may determine this depending on whether or not the reservation display language is included in the list of displayable languages acquired in step S15. If the reservation display language is a displayable language (Yes in step S16), the process proceeds to step S17, and if the reservation display language is not a displayable language (No in step S16), the process proceeds to step S18 to calculate the optimal choice.

In step S17, the display changing unit 116 sets the remote 150 to display the operation state in a display form corresponding to the reservation display language. Specifically, the display changing unit 116 sends a setting command indicating the reservation display language as the language to be displayed, to the remote 150 of the address identified in step S12 via the fieldbus communication unit 112. In the remote 150 that has received such a setting command, the screen construction unit 155 refers to the pictogram information stored in the pictogram information storage unit 153 and changes the display form for the screen image displayed on the display unit 152 to one corresponding to the language indicated by the setting command. The process then proceeds to step S20.

In step S18, the display changing unit 116 refers to the language information stored in the language information storage unit 113 to identify the language having the highest comprehensibility out of the displayable languages included in the list acquired in step S15, with respect to the reservation display language of the room corresponding to the room number identified in step S11. Specifically, the display changing unit 116 refers to the language table 113a illustrated in FIG. 6 and identifies the row including the largest value stored in the comprehensibility column 113d, out of the rows in which the reservation display language corresponding to the room number identified in step S11 is stored in the reservation display language column 113b and in which the displayable language in the list acquired in step S15 is stored in the displayable language column 113c. The display changing unit 116 then identifies the language stored in the displayable language column 113c of the identified row.

The display changing unit 116 then sets the remote 150 to display the operation state in the display form corresponding to the language identified in step S18. Specifically, the display changing unit 116 sends a setting command indicating the language identified in step S18 as the language to be displayed, to the remote 150 of the address identified in step S12 via the fieldbus communication unit 112. In the remote 150 that has received such a setting command, the screen construction unit 155 refers to the pictogram information stored in the pictogram information storage unit 153 and changes the display form for the screen image displayed on the display unit 152 to one corresponding to the language indicated by the setting command. The process then proceeds to step S20.

In step S20, the display changing unit 116 determines whether or not the determination in step S14 has been made for all room numbers indicated in the display information. If the determination in step S14 has been made for all room numbers (Yes in step S20), the process ends, and if there are still room numbers corresponding to the reservation display language that have not yet been determined in step S14 (No in step S20), the process returns to step S11.

For example, by performing the flowchart illustrated in FIG. 12 during a period before check-in, a display form suitable for the guest staying that day can be set.

In step S10 of FIG. 12, the information acquiring unit 115 can readily change the display form to one corresponding to a new guest by acquiring only the display information different from the previously acquired display information.

As described above, by changing the display form for the remote 150 of the air conditioner 130 in the room where a guest is staying in accordance with the language used when the reservation for the stay was made, the guest can easily comprehend the current operation state of the air conditioning.

When the remote 150 supports the language used when the reservation was made, the operation state is displayed in a display form corresponding to the language, and consequently, the guest can feel a sense of security as if they were staying in a hotel room in their own country, even when in a foreign country.

Even when the remote 150 does not support the language used when the reservation was made, since the operation state is displayed in a display form corresponding to the language having the highest comprehensibility for the guest out of the multiple languages supported by the remote 150, the guest can easily comprehend the operation state.

Note that, since at least one of a character string indicating the operation state in a specific language and a picture allowing a native speaker of the specific language to comprehend the operation state is displayed, the guest can easily comprehend the operation state.

The system controller 110 can acquire the information indicating the language used by the user when the reservation was made from the room management device 170 to readily acquire such a language.

By notifying the system controller 110 of the language used for displaying the Web page, the room management device 170 can readily notify the system controller 110 of the language easily understandable by the user.

By allowing the user to select the language used to display the Web page, the language understandable by the user can be readily identified.

Note that, in the embodiments described above, the room management device 170 determines the language used for displaying the reservation page to be the language used when the reservation was made, but the embodiments are not limited to such an example. For example, if a user makes a reservation by telephone or the like without using the Web page, the operator who accepted the reservation should enter the necessary information into the accommodation management table 172*a*.

What is claimed is:

1. An air conditioning system comprising:
   an equipment management device to display an operation state of an air conditioner provided in a room and to control operation of the air conditioner performing air conditioning for the room, the equipment management device being placed in the room; and
   a system controller to control the equipment management device;
   wherein the system controller causes the equipment management device to change a display form for the operation state according to a first language, the first language being used by a user just for making a reservation for staying in the room.

2. The air conditioning system according to claim 1,
   wherein the system controller causes the equipment management device to display the operation state in a first display form corresponding to the first language when the equipment management device supports the first language.

3. The air conditioning system according to claim 2,
   wherein, in the first display form, at least one of a character string indicating the operation state in the first language and a picture enabling a native speaker of the first language to comprehend the operation state.

4. The air conditioning system according to claim 1,
   wherein when the equipment management device does not support the first language, the system controller causes the equipment management device to display the operation state in a second display form corresponding to a second language, out of a plurality of languages supported by the equipment management device, the second language having a calculated highest comprehensibility for a native speaker of the first language.

5. The air conditioning system according to claim 4,
   wherein, in the second display form, at least one of a character string indicating the operation state in the second language and a picture enabling a native speaker of the second language to comprehend the operation state.

6. The air conditioning system according to claim 1,
   wherein the system controller acquires information indicating the first language from a room management device accepting a reservation for a hotel from the user.

7. The air conditioning system according to claim 6,
   wherein the room management device accepts the reservation from the user by using a Web page, and
   wherein the first language is a language used for displaying the Web page.

8. The air conditioning system according to claim 7,
   wherein the first language is a language selected on the Web page by the user as a language used for displaying the Web page.

9. The air conditioning system according to claim 2,
   wherein the system controller acquires information indicating the first language from a room management device accepting a reservation for a hotel from the user.

10. The air conditioning system according to claim 3,
    wherein the system controller acquires information indicating the first language from a room management device accepting a reservation for a hotel from the user.

11. The air conditioning system according to claim 4,
    wherein the system controller acquires information indicating the first language from a room management device accepting a reservation for a hotel from the user.

12. The air conditioning system according to claim 5,
    wherein the system controller acquires information indicating the first language from a room management device accepting a reservation for a hotel from the user.

13. The air conditioning system according to claim 1,
    further comprising the air conditioner.

14. A system controller to display an operation state of an air conditioner provided in a room and to control an equipment management device controlling operation of the air conditioner performing air conditioning for the room, the system controller comprising processing circuitry
    to acquire information indicating a first language, the first language being used when a by a user just for making a reservation for staying in the room; and
    to change a display form for the operation state according to the first language.

\* \* \* \* \*